Feb. 2, 1926.
C. S. PEREA
1,571,430
TRANSMISSION CONTROL
Filed Dec. 5, 1924   2 Sheets-Sheet 1
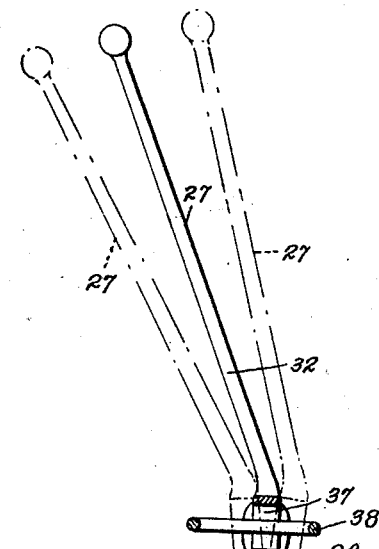
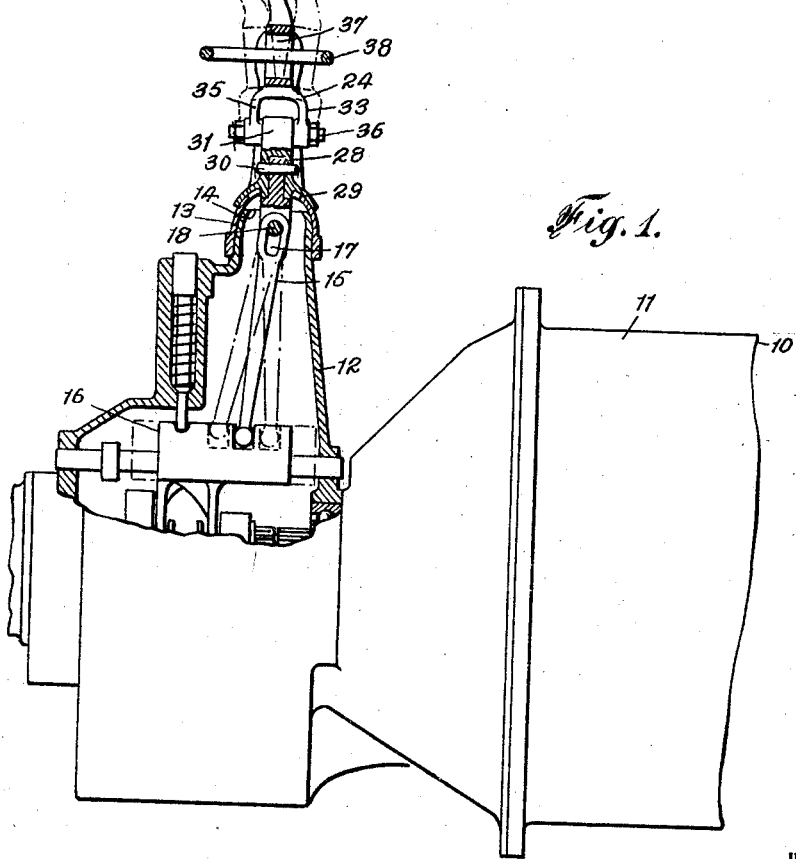
INVENTOR
Cecilio S. Perea.
BY
N. T. Criswell
ATTORNEY Feb. 2, 1926.                                               1,571,430
C. S. PEREA
TRANSMISSION CONTROL
Filed Dec. 5, 1924                         2 Sheets-Sheet 2
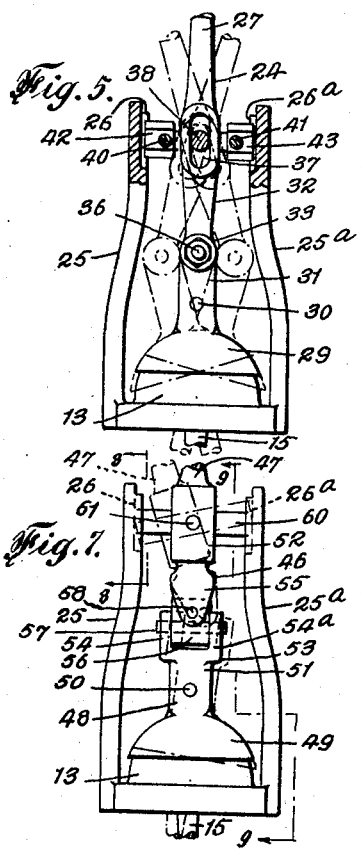
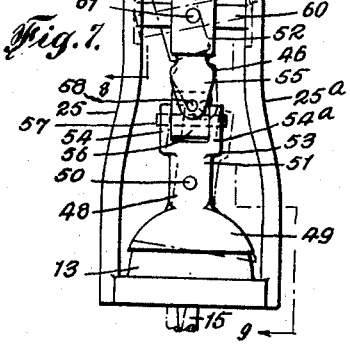
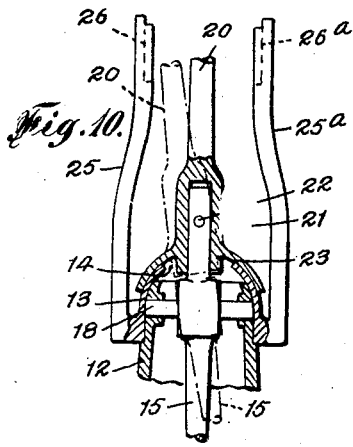
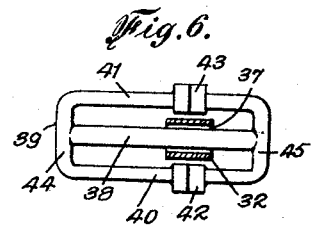
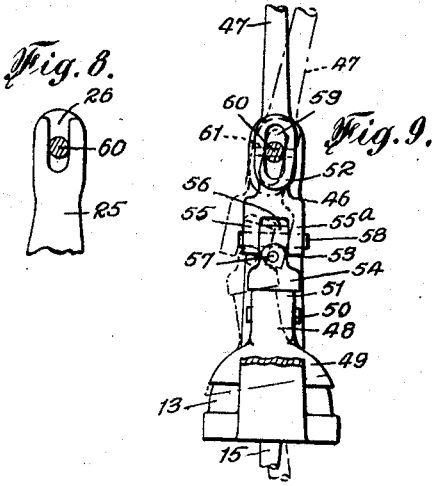
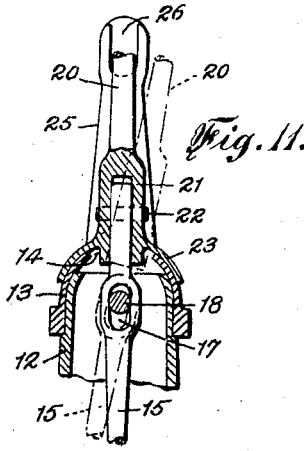
INVENTOR
Cecilio S. Perea
BY
W. T. Criswell
ATTORNEY Patented Feb. 2, 1926.

1,571,430

UNITED STATES PATENT OFFICE.

CECILIO S. PEREA, OF BROOKLYN, NEW YORK.

TRANSMISSION CONTROL.

Application filed December 5, 1924. Serial No. 754,082.

*To all whom it may concern:*

Be it known that I, CECILIO S. PEREA, a citizen of the Republic of Mexico, and a resident of New York, borough of Brooklyn, in the county of Kings and State of New York, have invented certain new and useful Improvements in a Transmission Control, of which the following is a full, clear, and exact specification.

This invention related more particularly to a class of devices adapted to be used on motor vehicles.

My invention has for its object primarily to provide a control designed to be employed on automobiles and like motor-vehicles for permitting the operating lever or bar of the transmission of one vehicle to be changed from its normal shifting directions to different selective adjustments for shifting the gears of the transmission without changing the standard adjustments of the transmission whereby the vehicle may be operated according to the method of adjustment of the transmission operating lever of another vehicle, and which may include interchangeable forms of operating levers so that instructors of automobile driving may use a single vehicle for teaching beginners to operate various types of automobiles, in order to avoid employing the particular form of automobile which the pupil desires to learn to operate. An automobile school or a driving instructor may thereby save the great expense of possessing various makes of automobiles for accommodating the requirement of pupils.

These advantages are accomplished mainly by providing one or more transmission operating levers for interchangeable use on various makes of automobiles and like motor vehicles, and each lever has on its lower end means for detachably fastening its lower end to the gear shifting bar which operates the transmission of the vehicle so that the lever will be in the customary upstanding position above the casing of the transmission. One or a number of the levers may be divided into lower and upper parts which are movably connected preferably by a universal joint so that with the movement of the upper part of the lever in one direction the lower part of the lever will move in an opposite direction, and the upper part of one or more of the levers may be movably supported above the transmission casing. When it is desired to operate, or instruct a person to operate the transmission control lever of a given vehicle according to the method of operating the transmission lever of another vehicle the operating lever suitable for the purpose is detachably mounted on the gear shifting bar of the vehicle. Instructions are then given as to the directions for shifting the operating lever according to the standard adjustments of the operating lever of the other vehicle which the pupil desires to learn to operate, and by interchanging the different forms of the levers in this manner one vehicle may be employed for teaching the transmission control of various other makes of automobiles and autotrucks.

A further object of the invention is to provide interchangeable transmission control of a simple, efficient and durable construction which may be made in appropriate sizes.

With these and other objects in view, the invention will be hereinafter more fully explained with reference to the accompanying drawings forming a part of this specification in which similar characters of reference indicate corresponding parts in all the views, and will then be pointed out in the claims at the end of the description.

In the drawings, Figure 1 is a fragmentary view showing partly in elevation, partly in section and partly in detail, a well known make of automobile transmission with a controlling device embodying one form of my invention applied thereto.

Fig. 2 is a diagram showing the direction for shifting the operating lever for controlling the transmission of another well known make.

Fig. 3 is a diagram showing the directions for shifting the operating lever for controlling the transmission of still another make.

Fig. 4 is a diagram showing the directions for shifting the operating lever for controlling the transmission illustrated in Fig. 1.

Fig. 5 is a fragmentary view showing an elevation, partly in section, of the lower portion of the form of my device shown in Fig. 1.

Fig. 6 is an enlarged plan, partly in section, of the device for adjustably supporting the operating lever illustrated in Figs. 1 and 5.

Fig. 7 is a fragmentary view showing an elevation of the lower portion of a slightly different form of the device.

Fig. 8 is an enlarged fragmentary view showing in elevation part of the device taken on the line 8—8 of Fig. 7.

Fig. 9 is a fragmentary view, partly sectional and partly broken away, taken on the line 9—9 of Fig. 7.

Fig. 10 is a fragmentary detail sectional view of a form of device for operating the transmission shown in Fig. 1, and Fig. 11 is a fragmentary detail sectional view taken vertically through the parts of the form of the device shown in Fig. 10.

Illustrative of one method of practicing my invention I may employ a Buick automobile, not shown, and which is equipped with the commonly known form of transmission, as 10 Fig. 1. The casing 11 of this transmission has the chambered extension, as 12, with a partially spherical portion, as 13, having in its upper part an opening 14. In the chambered extension 12 is the customary gear shifting bar 15 adapted to be manually adjusted for operating the mechanism 16 of the transmission in the well known manner. In the upper part of the gear shifting bar is an opening 17 in which is a pin or stud 18 having its ends held in the wall of the spherical portion 13 of the extension 12 of the casing 11 of the transmission for allowing the gear shifting bar to be adjustably swung back and forth to operate the transmission. The upper end portion 19 of the gear shifting bar protrudes through the opening 14 of the spherical portion 13 of the transmission casing, and this upper end part 19 of the gear shifting bar is provided by severing from the gear shifting bar the manually operative lever or bar, as 20, usually employed for shifting the gears of the transmission.

On the lower end of the operating lever 20 is provided a sleeve or socket member 21 in which the upper end 19 of the gear shifting bar 15 is disposed, and the lever and gear shifting bar are detachably fastened together by a pin 22 which is removably inserted through registered holes in the socket member 21 and in the upper end 19 of the gear shifting bar. Surrounding the socket member 21 is a cap 23 which is movable on the spherical portion 13 of the transmission casing, and this cap is also of a partial spherical shape conforming to the curvature of the portion 13. The transmission mechanism 16 is operated by this form of lever control 20 according to the diagram, as A Fig. 4, which indicates the directions of movements of the lever for operating the transmission of a Buick automobile. When the transmission is out of operation the lever is in a neutral position, as indicated at B, and when in reverse speed the lever is swung to the position, shown at C. When the lever is shifted to the position, as at D, the transmission mechanism will be adjusted to first speed position, and when the lever is shifted to the position, as at E, the transmission will be adjusted to second speed position. When the lever is shifted to the position, as at F, the transmission mechanism will be adjusted to high speed.

In order to permit the transmission mechanism 16 of a Buick automobile to be operated according to the method of operating a commonly known standard transmission, as indicated in diagram G, Fig. 2, which is employed by several makes of automobiles, the lever control 20 is exchanged for a form of control, as 24 Figs. 1, 5, 6. To employ the control 24 I provide on opposite parts of the spherical portion 13 of the transmission casing 11 two upwardly disposed fixed brackets or bars 25, 25ª in spaced relation, and these brackets are of lengths so that their upper ends terminate some distance above the spherical portion 13 of the transmission casing. In the inner opposed faces of the upper ends of the bracket bars 25, 25ª are alined notches, as 26, 26ª, respectively. The control 24 includes an operating lever 27 having on its lower end a sleeve 28 with a surrounding cap 29, which may be similar in formations to the sleeve 21 and cap 23 of the lever 20, and the sleeve 28 is detachably fastened to the gear shifting bar 15 of the transmission mechanism by a pin 30 which is removably inserted through registered holes in the sleeve 28 and in the gear shifting bar. The operating lever 27 is divided into a lower part 31 and an upper part 32, and these parts of the lever are pivotally connected by a universal joint, as 33. The joint 33 is preferably of a well known type having the substantially U-shaped bar 35 on the lower end of the upper part 32 of the lever 27, and this U-shaped bar is in straddle arrangement of the upper end of the lower part 31 of the lever. The lower part 31 of the lever 27 and the arms of the U-shaped bar are pivotally connected by a bolt, at 36, so that when the upper part 32 of the lever 27 is shifted in one direction the lower part 31 with the cap 29 will move in an opposite direction. In the upper part 32 of the operating lever 27 may be a substantially O-shaped opening 37, and this apertured part of the lever is rotatably and slidably movable on the arm or bar, as 38, which extends crosswise within an approximately O-shaped guide frame, as 39 Figs. 1, 5, 6. The guide frame 39 is disposed between the notched upper ends of the fixed bracket bars 25, 25ª, and this guide frame is of a width so that its side arms or members 40, 41 are spaced from the bracket bars. The guide frame 39 is also arranged so that the bar 38 is disposed on a similar relative plane above the pivoting bolt 36 of the universal joint 33, and on the central parts of the side members 40, 41 of the guide frame are two corresponding laterally protruding lugs 42, 43 both preferably of hexagon shapes which are removably seated in the notches 26, 26ª of the fixed bracket bars 25, 25ª. The guide frame is thereby prevented from pivotal movement in the bracket bars 25, 25ª. The guide frame is positioned with relation to the universal joint so that when the upper part 32 of the operating lever 27 is pivotally swung on the bar 38 toward and from the side members 40, 41 of the guide frame 39 the lower part 31 of the lever and the gear-shifting bar 15 of the transmission mechanism will move in opposite directions, and when the upper part 32 of the lever is slidably moved back and forth lengthwise of the bar 38 of the guide frame the lower part 31 of the lever and the gear shifting bar 15 of the transmission mechanism will move back and forth in opposite directions. When this form of the device or control is operated for teaching its normal adjustments without changing the standard adjustments of the transmission mechanism 16, and when the operating lever is in neutral position, as indicated at H Fig. 2, the shift may be made to reverse position, as I, by slidably moving the lever on the bar 38 toward the end, as 44, of the guide frame 39, and the lower part 30 with the cap 29 and the gear shifting bar 15 of the transmission mechanism will be moved in an opposite direction. By then pivotally moving the lever to the position I the lower part 30 of the lever will move the gear shifting bar for adjusting the transmission mechanism 16 in its standard reverse position, as at C Fig. 4. When the operating lever 27 is moved to first speed position, as J, the lever is pivotally swung on the bar 38 toward the side member 40 of the guide frame 39 and the lever is then slidably moved on the bar 38 to the position J. The lower part 30 of the lever with its cap 29 and gear shifting bar 15 will move to correspond with the position D, Fig. 4, which conforms with the standard adjustment to first speed of the transmission mechanism. When the operating lever 27 is moved to second speed position K the lever is pivotally swung on the bar 38 toward the side member 41 of the guide frame 39 and the lever is slidably moved on the bar 38 to the position K. The lower part 30 of the lever with its cap 29 and gear shifting bar 15 will move to correspond with the position E Fig. 4 which conforms with the standard adjustment to second speed of the transmission mechanism 16. When the operating lever 27 is moved to high speed position, as L, the lever is slidably moved on the bar 38 toward the end 45 of the guide frame 39 and the lever is pivotally swung on the bar 38 to the position L. The lower part 30 of the lever with its cap 29 and gear shifting bar 15 will move to correspond with the position F, Fig. 4, which conforms with the standard adjustment of high speed of the transmission mechanism.

To enable the transmission mechanism 16 of a Buick automobile to be operated according to the method of operating the transmission of a Dodge automobile, as shown in diagram M Fig. 3, the lever control 20 is exchanged for a form of control, as 46 Figs. 7, 8, 9. The control 46 is preferably composed of an operating lever 47 having on its lower end a sleeve 48 with a surrounding cap 49 which may be similar in formations to the sleeve 21 and cap 29 of the lever 20. The sleeve 48 is removably attached to the gear shifting bar 15 of the transmission mechanism 16 by a pin 50 which is removably inserted through registered holes in the sleeve 48 and in the gear shifting bar 15. The operating lever 47 is divided into a lower lower part 51 and an upper part 52, and these parts are pivotally connected by a universal joint, as 53. The joint 53 may be of a commonly known form having two spaced fingers or lugs 54, 54ª projecting upwardly from the upper end of the lower part 51 of the lever 47, and extending downward from the lower end of the upper part 52 of the lever are two spaced fingers or lugs 55, 55ª which are movably disposed crosswise of the space between the fingers 54, 54ª of the lower part of the lever. Between the fingers 54, 54ª and 55, 55ª is a movable block or link 56 having its lower part pivoted, at 57, to the pair of fingers 54, 54ª, and the upper part of the block is pivoted, at 58, to the pair of fingers 55, 55ª. In the upper part 52 of the lever 47 above the universal joint 53 is a substantially O-shaped opening 59 in which is a stud or short rod 60 held to the lever by a pin 61 which is driven through registered holes in the stud and in opposite parts of the walls of the opening 59. The stud is of a length so that its ends are rotatably seated in the notches 26, 26ª of the brackets 25, 25ª of the casing of the transmission. The notches 26, 26ª of the fixed brackets 25, 25ª are of depths so that the stud 60 of the lever 47 are movable upwardly and downwardly as well as being rotatable therein. The lever 47 may thereby be moved toward and from the brackets 25, 25ª and also moved back and forth outwardy and inwardly from between the brackets. The lower part 51, cap 49 and the gear shifting bar 15 of the transmission mechanism 16 will then move in an opposite direction to each adjustment of the lever 47. When this form of the device or control is operated for teaching the normal operation of the transmission of a Dodge car without changing the standard adjustments of the transmission mechanism 16, and when the operating lever 47 is in neutral position, as indicated, at M Fig. 3, the shift may be made to reverse position, as N, by moving the upper part of the lever to position N. The lower part 51, cap 49 and the gear shifting bar 15 of the transmission mechanism 16 will then be adjusted to positions corresponding with the standard reverse position C, Fig. 4. When the upper part of the lever 47 is moved to first speed position, as O Fig. 3, the lower part 51 of the lever with the cap 49 and gear shifting bar 15 will move to correspond with the position D, Fig. 4, which conforms with the standard adjustments to first speed of the transmission mechanism 16. When the upper part of the operating lever 47 is moved to second speed position P the lower part 51 of the lever with the cap 49 and gear shifting bar 15 will move to correspond with the position E, Fig. 4, which conforms with the standard adjustment to second speed of the transmission mechanism. When the upper part of the lever 47 is moved to high speed position Q, Fig. 3, the lower part 51 of the lever with the cap 49 and gear shifting bar 15 will move to correspond with the position F, Fig. 4, which conforms with the standard adjustment to high speed of the transmission mechanism. Thus by using my improved interchangeable forms of operating levers the transmission of one automobile and like vehicle may be changed from its normal shifting directions to different selective adjustments for operating the transmission without changing its standard adjustments, in order to permit a single automobile to be employed for teaching persons to operate different types of automobiles. For example, an instructor having a Dodge or Buick or any of the well known makes of automobiles provided with a standard form of transmission will be enabled to teach the method of transmission control of the other vehicles.

In the foregoing description, I have embodied the preferred form of my invention, but I do not wish to be understood as limiting myself thereto, as I am aware that modifications may be made therein without departing from the principle or sacrificing any of the advantages of this invention, therefore, I reserve to myself the right to make such changes as fairly fall within the scope thereof.

Having thus described my invention, I claim as new and desire to secure by Letters Patent:—

1. The combination with the gear shifting bar of an automobile transmission, of an operating lever having its lower end detachably mounted on the bar, said lever pivotally supported in upstanding position for being shifted according to different selective adjustments and said lever having movably jointed parts connected to the bar for operating with the operation of the lever to move the bar to operate the transmission without changing the standard adjustments of the transmission.

2. The combination with the gear shifting bar of an automobile transmission, of an operating lever having its lower end detachably mounted on the bar, said lever movably supported in upstanding position for being shifted according to different selective adjustments and said lever composed of two parts connected by a universal joint with one joint connected to the bar for operating with the operation of the lever to move the bar to operate the transmission without changing the standard adjustments of the transmission.

3. The combination with the gear shifting bar of an automobile transmission, of a pivoted upstanding lever for being shifted according to selective adjustments, and means detachably fastening the lower end of the lever to the bar for operating with the operation of the lever to move the bar to operate the transmission without changing the standard adjustments of the transmission.

4. The combination with the gear shifting bar of an automobile transmission, of a pivoted upstanding operating lever, and means detachably fastening the lower end of the lever to the bar and the central part of the lever pivotally supported, said lever having its portion under the pivot movably jointed for operating with the operation of the lever to move said means and the bar to operate the transmission without changing the standard adjustments of the transmission.

5. The combination with the gear shifting bar of an automobile transmission, of a pivoted upstanding lever for being shifted according to selective adjustments, means detachably fastening the lower end of the lever to the bar, the lower portion of said lever composed of two parts, and a universal joint connecting said parts of the lever for operating with the operation of the lever to move said means and the bar to operate the transmission without changing the standard adjustments of the transmission.

6. The combination with the casing and gear shifting bar of an automobile transmission, of two spaced bracket arms on the casing at opposite sides of the opening through which one end of the bar protrudes, an operating lever having its lower end detachably mounted on the bar with its upper part pivoted between the bracket arms for being shifted according to selective adjustments, and said lever having below its pivot movably jointed parts connected to the bar for operating with the operation of the lever to move the bar to operate the transmission without changing the standard adjustments of the transmission.

7. The combination with the casing having an opening and the gear shifting bar of an automobile transmission, of two spaced bracket arms on the casing at opposite sides of its opening through which one end of the bar protrudes, an operating lever having its lower end detachably mounted to the bar for being shifted according to selective adjustments and the lever composed of two parts, means movably supporting the upper part of the lever between the bracket arms of the casing, and a universal joint connecting both parts of the lever for causing the lever with its operation to move the bar to operate the transmission without changing the standard adjustments of the transmission.

8. The combination with the casing having an opening and the gear shifting bar of an automobile transmission, of two spaced bracket arms on the casing at opposite sides of its opening through which one end of the bar protrudes, an operating lever composed of two parts disposed above the bar between the bracket arms of the casing for being shifted according to selective adjustments, means detachably connecting the lower part of the lever to the protruding end of the bar, means movably supporting the upper part of the lever to the bracket arms, and means movably connecting the parts of the lever for causing the lever with its operation to move the bar to operate the transmission without changing the standard adjustments of the transmission.

9. The combination with the casing having an opening and the gear shifting bar of an automobile transmission, of two spaced bracket arms on the casing at opposite sides of its opening through which one end of the bar protrudes, an operating lever composed of two parts disposed above the bar between the bracket arms of the casing for being shifted according to selective adjustments, a sleeve on the lower end of the lower part of the lever, detachably connected to the protruding end of the bar, means movably supporting the upper part of the lever to the bracket arms, and a universal joint connecting the parts of the lever for causing the lever with its operation to move the bar to operate the transmission without changing the standard adjustments of the transmission.

10. The combination with the casing having an opening and the gear shifting bar of an automobile transmission, of two spaced bracket arms on the casing at opposite sides of its opening through which one end of the bar protrudes, an operating lever composed of two parts disposed above the bar between the bracket arms of the casing for being shifted according to selective adjustments, a sleeve on the lower end of the lower part of the lever, detachably connected to the protruding end of the yoke, means movably supporting the upper part of the lever to the bracket arms, a universal joint connecting the parts of the lever for causing the lever with its operation to move the bar to operate the transmission without changing the standard adjustments of the transmission, and a fixed guide cap surrounding the sleeve, movably engaging the casing for limiting the movements of the lever.

This specification signed and witnessed this 4" day of December, A. D. 1924.

CECILIO S. PEREA.